(12) United States Patent
Liu et al.

(10) Patent No.: US 12,509,111 B2
(45) Date of Patent: Dec. 30, 2025

(54) AUTONOMOUS VEHICLE REMOTE ASSISTANCE MANAGEMENT

(71) Applicant: GM Cruise Holdings LLC, San Francisco, CA (US)

(72) Inventors: Jiayang Liu, Palo Alto, CA (US); Jonathan Soini, Seattle, WA (US); Arthur L. Gillespie, III, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 225 days.

(21) Appl. No.: 18/358,829

(22) Filed: Jul. 25, 2023

(65) Prior Publication Data

US 2025/0033659 A1 Jan. 30, 2025

(51) Int. Cl.
*B60W 60/00* (2020.01)

(52) U.S. Cl.
CPC ....... *B60W 60/001* (2020.02); *B60W 2756/10* (2020.02)

(58) Field of Classification Search
None
See application file for complete search history.

(56) References Cited

U.S. PATENT DOCUMENTS

| 2017/0127215 | A1* | 5/2017 | Khan | G08G 1/202 |
| 2024/0036571 | A1* | 2/2024 | Goldman | G06Q 10/063112 |
| 2024/0112101 | A1* | 4/2024 | Salter | G06Q 10/063112 |

* cited by examiner

*Primary Examiner* — Donald J Wallace
*Assistant Examiner* — Paysun Wu
(74) *Attorney, Agent, or Firm* — CANTOR COLBURN LLP

(57) ABSTRACT

Aspects of the subject technology relate to systems, methods, and computer-readable media for managing remote assistance for an autonomous vehicle. A request for remote assistance can be received from an autonomous vehicle (AV). A priority for ranking the AV in a queue can be determined based on the request for remote assistance. The AV can be ranked in the queue based on the determined priority. The AV can be matched to a remote assistance advisor through rules-based matching according to a position of the AV in the queue. Communication between the remote assistance advisor matched to the AV can be facilitated.

20 Claims, 8 Drawing Sheets

AUTONOMOUS VEHICLE REMOTE ASSISTANCE MANAGEMENT

BACKGROUND

1. Technical Field

The present disclosure generally relates to managing remote assistance for an autonomous vehicle and, more specifically, to using rules-based matching and queue position to match a remote assistance advisor to an autonomous vehicle requesting remote assistance.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
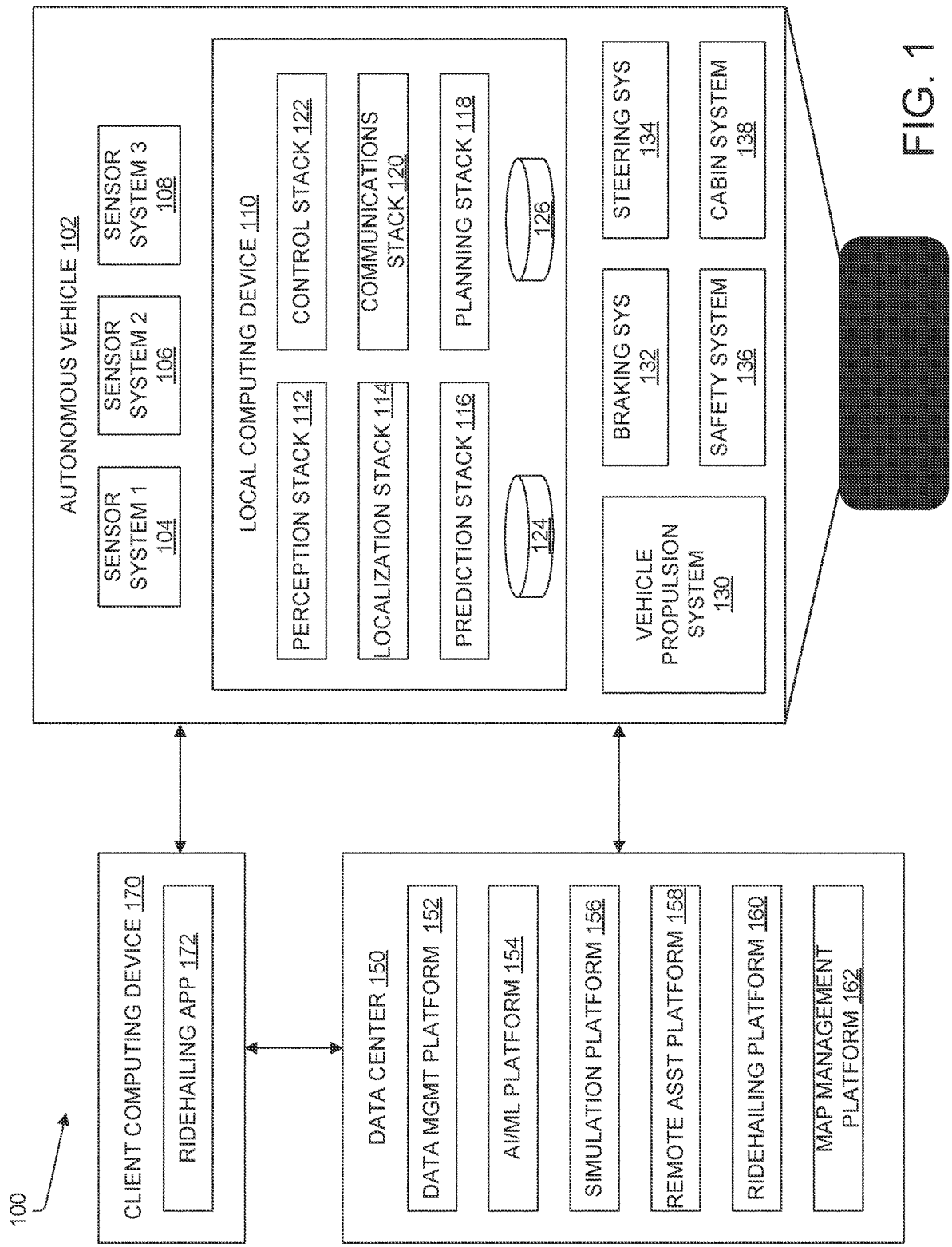
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Sometimes during the operation of an AV, the AV becomes stuck or otherwise unable to operate autonomously. As a result, the AV makes a request for human or advisor intervention, otherwise referred to as a request for a remote service advisor. The remote service advisor can then perform actions to try and triage the failed autonomous operation of the AV and return the AV to autonomous operation. For example, the remote service advisor can assist the AV in traversing around an obstacle so the AV is able to resume autonomous operation. In another example, if an AV is unable to autonomously navigate through a crowded area, then a remote service advisor can reroute the AV to a less crowded or otherwise different area, in which the AV can continue to operate autonomously.

When an AV is operating amongst a fleet of AVs having remote assistance needs, the burden on the remote assistance advisors can become overwhelming. In particular, there are less remote assistance advisors than the number of AVs in a fleet, making remote assistance advisor utilization a valuable resource. However, remote assistance advisor resources can be improperly consumed in providing remote assistance to a fleet of AVs. For example, an AV can initiate a false positive request for remote assistance that wastes resources when a remote assistance advisor answers the request. A false positive request for remote assistance, as used herein, can include a request for remote assistance that is not actually needed. For example, a false positive request for remote assistance can be generated when an AV is stuck in traffic and does not actually need remote assistance to autonomously drive through an area. Further, an advisor can be matched, e.g. randomly, to an AV without any specific skills or expertise in relation to providing remote assistance to the specific AV. For example, an advisor can have specific knowledge, or otherwise be located in a specific service area. However, the advisor can be matched to fill remote service requests of AVs outside of the specific service area. This can increase the amount of time it takes for the advisor to satisfy the remote assistance request, if the advisor can even satisfy the request at all based on their breadth or depth of knowledge associated with the service area.

The disclosed technology addresses the problems associated with the management of providing remote assistance to a fleet of AVs. Specifically and as will be discussed in greater detail later, AVs can be dynamically positioned in a remote assistance queue based on determined priorities for providing remote assistance to the AVs. Further, AVs can be matched with remote assistance advisors through rules-based matching according to positions of the AVs in the remote assistance queue.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170.

These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

Figure 2:
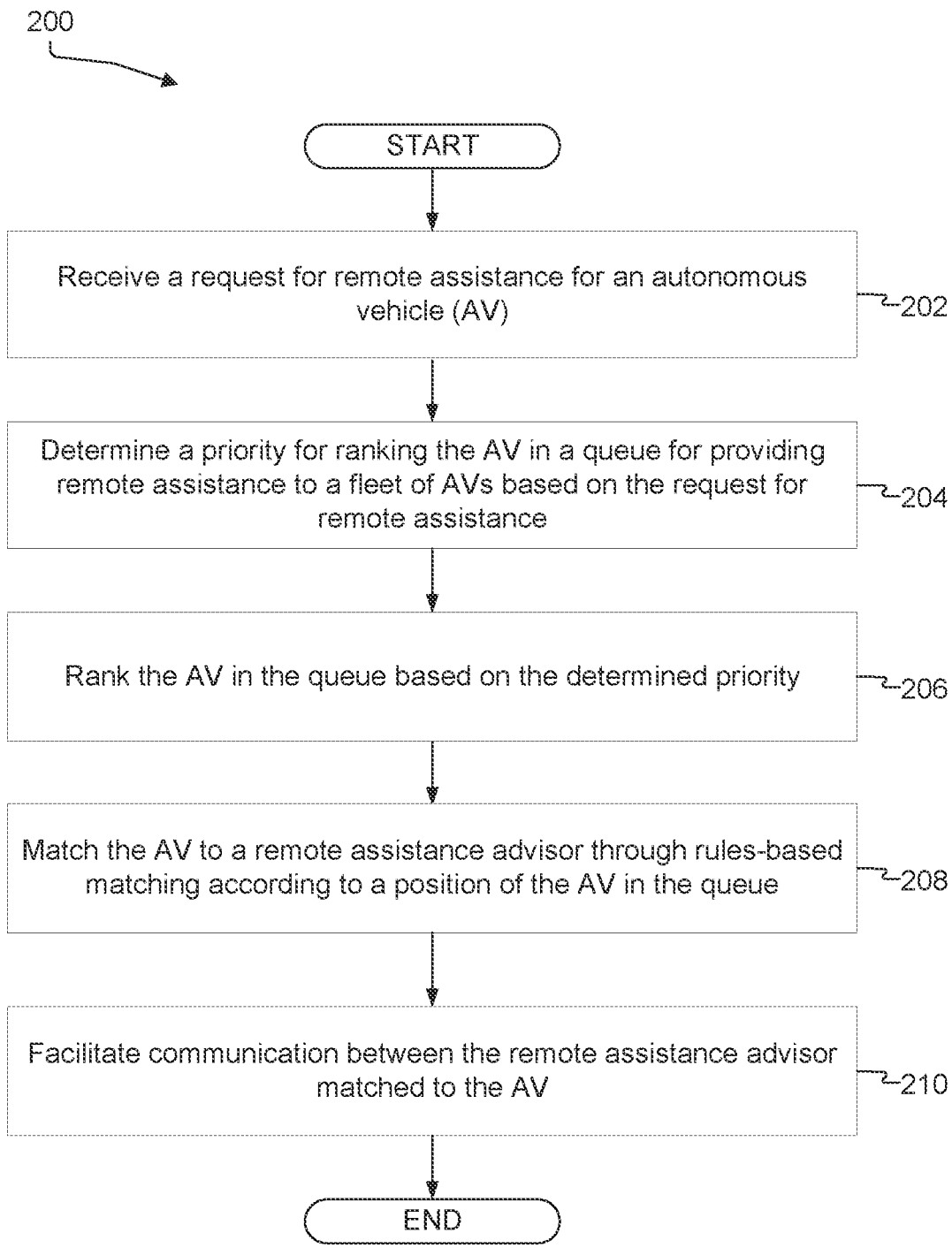
FIG. 2 illustrates a flowchart for an example method of matching a request for remote assistance according to queue priority to a remote assistance advisor based on rules, according to some aspects of the disclosed technology.

The disclosure now continues with a discussion of using rules-based matching and queue position to match a remote assistance advisor to an autonomous vehicle requesting remote assistance. Specifically, FIG. 2 illustrates a flowchart 200 for an example method of matching a request for remote assistance according to queue priority to a remote assistance advisor based on rules. The method shown in FIG. 2 is provided by way of example, as there are a variety of ways to carry out the method. Additionally, while the example method is illustrated with a particular order of operations, those of ordinary skill in the art will appreciate that FIG. 2 and the modules shown therein can be executed in any order and can include fewer or more modules than illustrated. Each module shown in FIG. 2 represents one or more operations, processes, methods or routines in the method.

At operation 202, a request for remote assistance is received for an autonomous vehicle. A request for remote assistance can include applicable information related to an autonomous vehicle, including the current state of the autonomous vehicle and surroundings of the autonomous vehicle (AV). Specifically, a request can include an indication of a specific AV requesting remote assistance and a location of the AV, e.g. the location of the AV when the AV requested remote assistance. Further, a request can include a reason that the AV is requesting assistance. For example, a request can include that a sensor has failed on an AV. In another example, a request can include that the AV has encountered a road blockage or some other situation that is preventing the AV from preceding in autonomous driving.

A request can be included as part of a set of requests for remote assistance. A set of requests can be defined with respect to a session for remote assistance, otherwise referred to as a session. Specifically, a session can be initiated when an AV begins requesting remote assistance through an initial request and continue requesting remote assistance for a specific duration of time after sending an initial remote assistance request. The remote assistance requests sent during this time can be grouped together as part of the set of requests sent during the session. The session can last for a set amount of time after the initial remote assistance request is sent, a set amount of time that is defined based on correlation between request, a set amount of time that is defined based on an outcome for the request for remote assistance, or a combination thereof. For example, a session can last until a remote assistance request is fulfilled and an AV no longer needs remote assistance (e.g., the AV proceeds with autonomous driving or the AV is disabled and is designated for retrieval by a human operator). In another example, a session can last until a false positive request is ignored or triaged by administrators. In yet another example, a session can last until a false positive request is answered and cleared by a remote assistance advisor.

At operation 204, a priority for ranking the AV (or the request from the AV) in a queue is determined based on a variety of factors, including the request for remote assistance. The queue can be a queue of providing remote assistance to a fleet of AVs. Specifically, the queue can be a priority queue of AVs that specifies an order in which remote assistance should be provided to the AVs in the queue. For example, an AV that is ranked highest in terms of priority for receiving remote assistance in the queue can be the next AV in the queue to receive remote assistance. Further, positions of the AVs in the queue can dynamically change. Specifically, positions of the AVs in the queue can change based on applicable factors related to fulfilling requests for remote assistance. For example, as remote assistance is provided to AVs and the AVs are removed from the queue, the AVs that are left in the queue can move up in the queue. Further, the status and state of the AV and/or the surroundings of the AV may change over time. This status/state information may be provided by the AV over time and the priority of the AV's request may correspondingly be updated (e.g., increase or decrease priority).

The priority for ranking the AV in the queue can be determined based on applicable parameters associated with the request for remote assistance. Specifically, and as will be discussed in greater detail later, the AV can be ordered in the queue based on a confidence that the request for remote assistance corresponds to the AV actually needing remote assistance. For example, if a request for remote assistance is likely to be a false negative, e.g. a request that does not need to be fulfilled by a remote assistance advisor, then the AV that sent the request can be prioritized near the bottom of the queue. Further and as will be discussed in greater detail later, the AV can be ordered in the queue based on a severity associated with failing to fulfill the request for remote assistance. For example, if failing to answer a request for remote assistance will lead to passengers in an AV being stranded, then the AV can be given a priority that ranks the AV at the top of queue or potentially at least above requests for assistance from AVs that do not presently include passengers and/or is not attempting to reach a passenger for pickup.

At operation 206, the AV is ranked in the queue based on the determined priority. Specifically, the AV can be ranked so that the AV's request for remote assistance will be answered based on the priority assigned to the AV in relation to priorities for remote assistance assigned to other AVs in the queue. For example, the AV can be ranked above AVs in the queue that have lower priorities for remote assistance than the AV. As follows, the AV can be ranked below AVs in the queue that have higher priorities for remote assistance than the AV.

In ranking the AV in the queue based on the determined priority, the AV can be newly added into the queue. Further, in ranking the AV in the queue based on the determined priority, the AV can already be ranked in the queue, and the position of the AV in the queue can change based on the determined priority. More specifically, positions of different AVs in the queue can dynamically change, e.g. as new requests are received and old requests are canceled or expired. For example, the AV can already be ranked in the AV based on a previous request. Further in the example, the previous request can be canceled and a new request can be received that is associated with a greater confidence that the AV needs remote assistance. As follows, the position of the AV can be moved up, otherwise dynamically changed, based on the new request. Positions of an AV in the queue can dynamically change based on changing positions of other AVs in the queue. For example, a first AV can be moved up in the queue over a second AV. As a result, the position of the second AV in the queue can drop.

At operation 208, the AV is matched to a remote assistance advisor through rules-based matching according to a position of the AV in the queue. Specifically, the AV can wait in the queue until it is time to match them with a remote assistance advisor according to their position in the queue. As will be discussed in greater detail later, once it is the AVs turn to be matched with a remote assistance advisor, then rules can be applied to match the AV with a remote assistance advisor.

In matching AVs to a remote assistance advisor through rules-based matching according to a position of the AVs in the queue, the matching process can begin by selecting the AV on the top of the priority queue. Then, in an optional operation, special case matching logic can be applied to attempt to match the AV to an advisor before rules-based matching is performed. Special case matching logic includes applicable special cases that can serve as exceptions to scenarios where AVs are matched through rules-based logic. An example of a special case scenario is whether an AV's last session ended within a specific amount of time and the same advisor that was matched to the AV is available for matching to an AV. For example, if the AV at the previous session of the AV at the top of the queue ended in the last ten minutes, and the advisor that was matched to the AV in the previous session is available, then rules-based matching can be skipped and the AV can be matched to the advisor. In another example, an AV can be matched to the same advisor as was matched to the AV in a previous session regardless of position of the AV in either or both a current session and the previous session.

Once the AV is selected, and optionally it is determined that special case matching logic does not apply to the AV, then rules-based matching can begin by finding rules from a plurality of different rules that are associated with, or otherwise applicable to the AV are identified. Then advisors that meet all or a portion of the rules are selected from a pool of advisors as candidate advisors for the AV. An AV can have a single candidate advisor or a plurality of candidate advisors. In identifying candidate advisors based on whether they meet rules, only advisors that meet all required rules can be selected as candidate advisors. Required rules with respect to rules-based matching of AVs to remote service advisors will be discussed in greater detail later.

Next a degree of matching between the candidate advisers and the AV is determined based on the rules, e.g. the rules that are applicable to the AV. An applicable technique can be used in identifying the degree of matching between the candidate advisers and the AV based on the rules that are applicable to the AV. Specifically, a matching score can be calculated for each candidate advisor that is the sum of the weights of applicable rules to the AV. For example, a matching score can be calculated for each candidate advisor that is the sum of the weight of all optional rules that are applicable to the AV. As follows, the candidate advisor that has the greatest degree of matching to the AV, e.g. the highest matching score, can be matched to the AV from the candidate advisors.

Alternatively, if no candidate advisors are identified for the AV, then a preemption process can be applied to match a remote assistance advisor to the AV. Specifically, if no candidate advisors are identified for the AV because none of the advisors in the advisor pool meet all of the required rules, then a preemption process can be applied. A preemption process can include an applicable process that would prevent the AV from failing to be matched to an advisor based strictly on a lack of candidate advisors, e.g. advisors who fail to meet the required rules. In an example of a preemption process a first AV with a high priority can be matched to a candidate advisor who is currently assisting a second AV with a lower priority than the first AV. Subsequently, the session between the advisor and the second AV can be paused and the candidate advisor can begin a session with the first AV. As follows, the session between the advisor and the second AV can resume once the session is ended between the advisor and the first AV. If no advisors are subsequently found through the preemption process, the session for the AV can be canceled or the session for the AV can be paused and re-considered later for matching to an advisor.

At operation 210, communication between the remote assistance advisor and the AV is facilitated. In facilitating communication between the remote assistance advisor and the AV, one or more applicable communication channels can be opened between the remote assistance advisor and the AV. For example, the remote advisor can exchange messages with the AV to triage the need for remote assistance. In another example, the remote advisor can take control of the AV, e.g. to navigate the AV to an area where the AV can continue autonomous operations. In another example, the remote advisor can send instructions to the AV to cause the AV to correct a behavior and return to autonomous operation.

Figure 3:
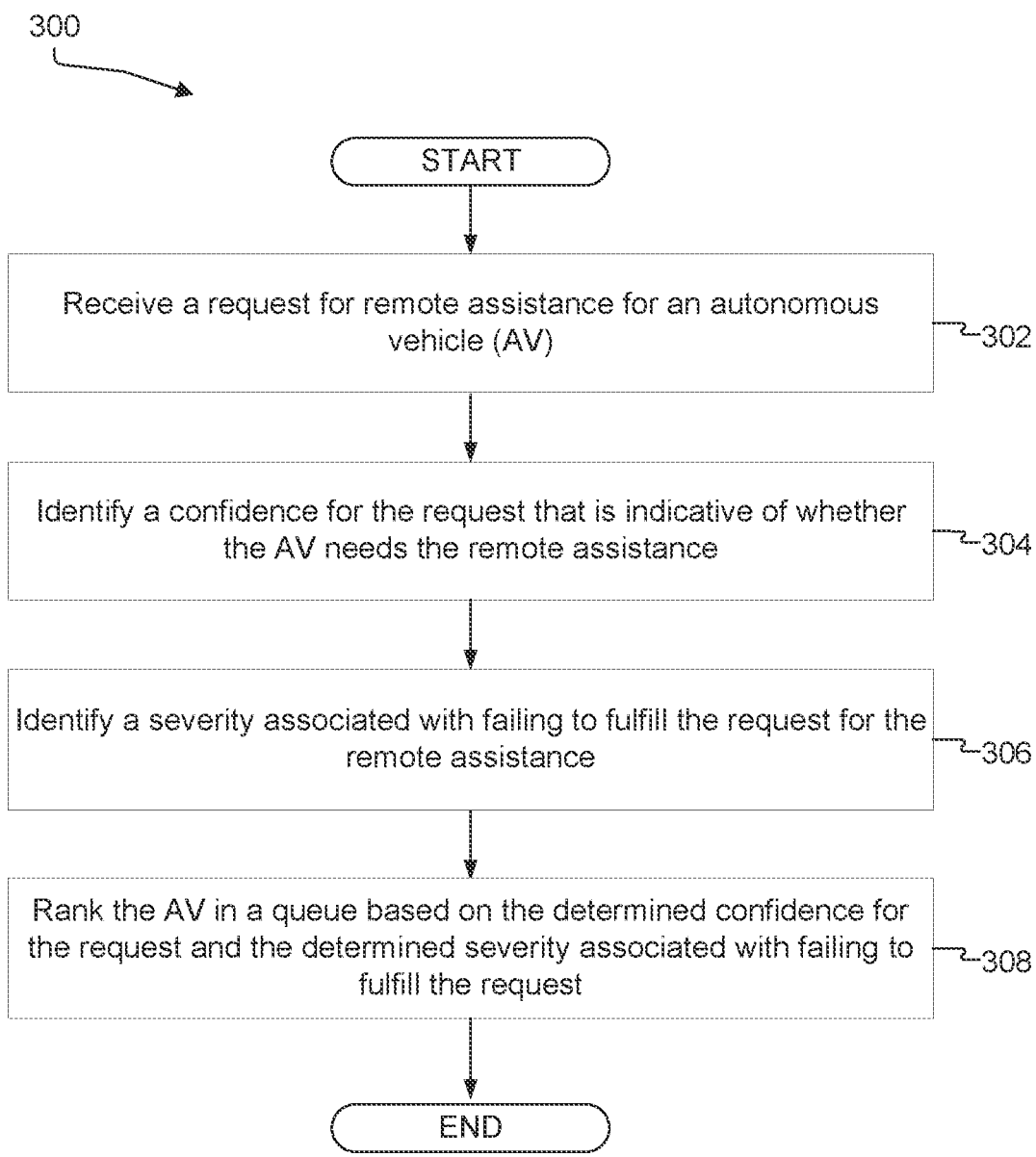
FIG. 3 illustrates a flowchart for an example method of ranking an autonomous vehicle in a queue of priority for receiving remote assistance based on a request for remote assistance, according to some aspects of the disclosed technology.

The disclosure now continues with a discussion of ranking an autonomous vehicle in a queue based on priority for receiving remote assistance. Specifically, FIG. 3 illustrates a flowchart 300 for an example method of ranking an autonomous vehicle in a queue of priority for receiving remote assistance based on a request for remote assistance. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

At operation 302, a request for remote assistance for an AV is received. The request can include or otherwise be used to determine a context associated with an AV requesting remote assistance. A context associated with an AV requesting remote assistance can applicable information about a current session and one or more past sessions of the AV requesting remote assistance. For example, a context associated with an AV requesting remote assistance can include a location of the AV, whether the AV has passengers, and information about the surrounding of the AV when making the request. Further, a context associated with an AV requesting remote assistance can include information in relation to a session, either past or current. For example, a context associated with an AV requesting remote assistance can include a duration of a session, a number and type of maneuvers performed during a session, an amount of time spent in each maneuver performed by the AV, a speed of the AV before, during, and after the session, a state of the AV before, during, and after a session, a number of positive answers between an advisor and the AV during a session, a number of negative answers during a session, whether a false positive request is sent during a session, and a duration of a session. Positive answers can include applicable affirmative answers to a query or question in relation to an AV. For example, a positive answer to a question of whether there is a collision can include that there is a collision. Negative answers can include applicable negative answers to a query or question in relation to an AV. For example, a negative answer to a question of whether there is a collision can include that there is not a collision.

At operation 304, a confidence for the request that is indicative of whether the AV needs remote assistance is identified. Specifically, a confidence that is indicative of whether the AV needs remote assistance can be identified. A confidence can be represented through an applicable metric that is indicative of whether the AV needs remote assistance. For example, a confidence can be expressed as a confidence score representing the probability that the request is associated with the AV truly needing assistance. Such probability can be referred to as the true positive probability. A confidence for a request that is indicative of whether the AV needs remote assistance can be identified using an applicable technique. For example, a confidence can be identified from a machine learning model that maps factors related to context associated with AVs requesting assistance to confidences that the AVs need remote assistance. Specifically, the confidence can be identified based on a model that maps factors of a current session of an AV and past sessions of an AV to varying confidence scores for the AV.

In identifying a confidence that is indicative of whether the AV needs remote assistance, the confidence can be identified based on a current session, e.g. of the AV. Specifically, the confidence can be identified from data included in and determined from the request and other requests included in the session. For example, the confidence can be identified based on a location of the AV during a current session that is indicated in the request sent by the AV. In another example, the confidence can be identified based on an amount of time since the session was initiated, e.g. through an initial request for assistance. In yet another example, the confidence can be identified based on a vehicle model of the AV, a VIN of the AV, a velocity of the AV, a software version of the software used by the AV, or a combination thereof. Specifically, an AV being at a known location where AVs need remote assistance can be indicative of a high degree of confidence that the AV needs remote assistance. Further, an increased amount of time that a session for an AV remains open can be indicative of a high degree of confidence that the AV needs remote assistance. Additionally, an AV being an older model, the AV not moving, and the AV using an old software version can be indicative of a high degree of confidence that the AV needs remote assistance.

Further, in identifying a confidence that is indicative of whether the AV needs remote assistance, the confidence can be identified based on a past session, e.g. of the AV. Specifically, the confidence can be identified from data included in and determined from requests included in past session. For example, the confidence can be identified based on locations of AVs during past sessions in relation to a current location of the AV. In another example, the confidence can be identified based on whether a request sent during a past session was a false positive. In yet another example, the confidence can be identified based on confidence scores for past sessions. Further, the confidence can be identified based on exchanges between advisors and AVs during past sessions. For example, the confidence can be identified based on the number of message exchanges between an advisor and an AV in providing the AV remote assistance. Specifically, a large number of exchanges between an advisor and an AV can be indicative of a high degree of confidence that the AV needs remote assistance.

At operation 306, a severity associated with failing to fulfill the request for the remote assistance is identified. A severity associated with failing to fulfill the request can be part of a severity assessment for the AV if the AV is not served in time. Specifically, a severity associated with failing to fulfill the request with respect to applicable risk factors can be identified. A severity associated with failing to fulfill the request for the remote assistance can be identified using an applicable technique. For example, a severity can be identified from a machine learning model that maps factors related to risk, e.g. as part of a context associated with AVs requesting assistance, to risks of the AVs not receiving remote assistance. Specifically, the severity can be identified based on a model that maps risk factors of a current session of an AV and past sessions of an AV to varying risk levels for the AV.

Examples of risk factors for determining a severity associated with failing to fulfill the request can include applicable risk factors including factors that relate to risks associated with passengers in an AV, risks associated with the AV itself, and risks associated with an enterprise of the AV. For example, if the risk is high that passengers will be stranded, then the severity risk associated with failing to fulfill the request can be set as high. In another example, if the risk is high that the AV will be damaged, then the severity risk can be set to high. In yet another example, if the risk is high that a fleet of AVs could be affected, then the severity risk can be set to high. In another example with respect to safety, risk factors can include whether the AV is in a conflict zone on the road, whether the AV is in a transit lane, and whether the AV is blocking the only lane. Other example of risk factors include how many AVs are stuck in close proximity, whether there is an emergency vehicle in the vicinity of the AV, the number of pedestrians that are around the AV or the scene, how much effect failing to provide remote assistance would have on customer experience, and whether failing to provide remote assistance is causing passenger pickup delay and trip delay.

At operation 308, the AV is ranked in the queue based on the determined confidence for the request and the determined severity associated with failing to fulfill the request. Specifically, the confidence for the request and the severity associated with failing to fulfill the request can be aggregated through an applicable technique to determine a priority for providing remote assistance to the AV. More specifically, the overall priority of the AV can be determined based on the product of the confidence for the request and the severity associated with failing to fulfill the request. In turn, the priority of the AV can be used to rank the AV in the queue in relation to other AVs in the queue. Specifically, the priority of the AV can be compared to priorities of other AVs in the queue to dynamically rank the AV in the queue.

Figure 4:
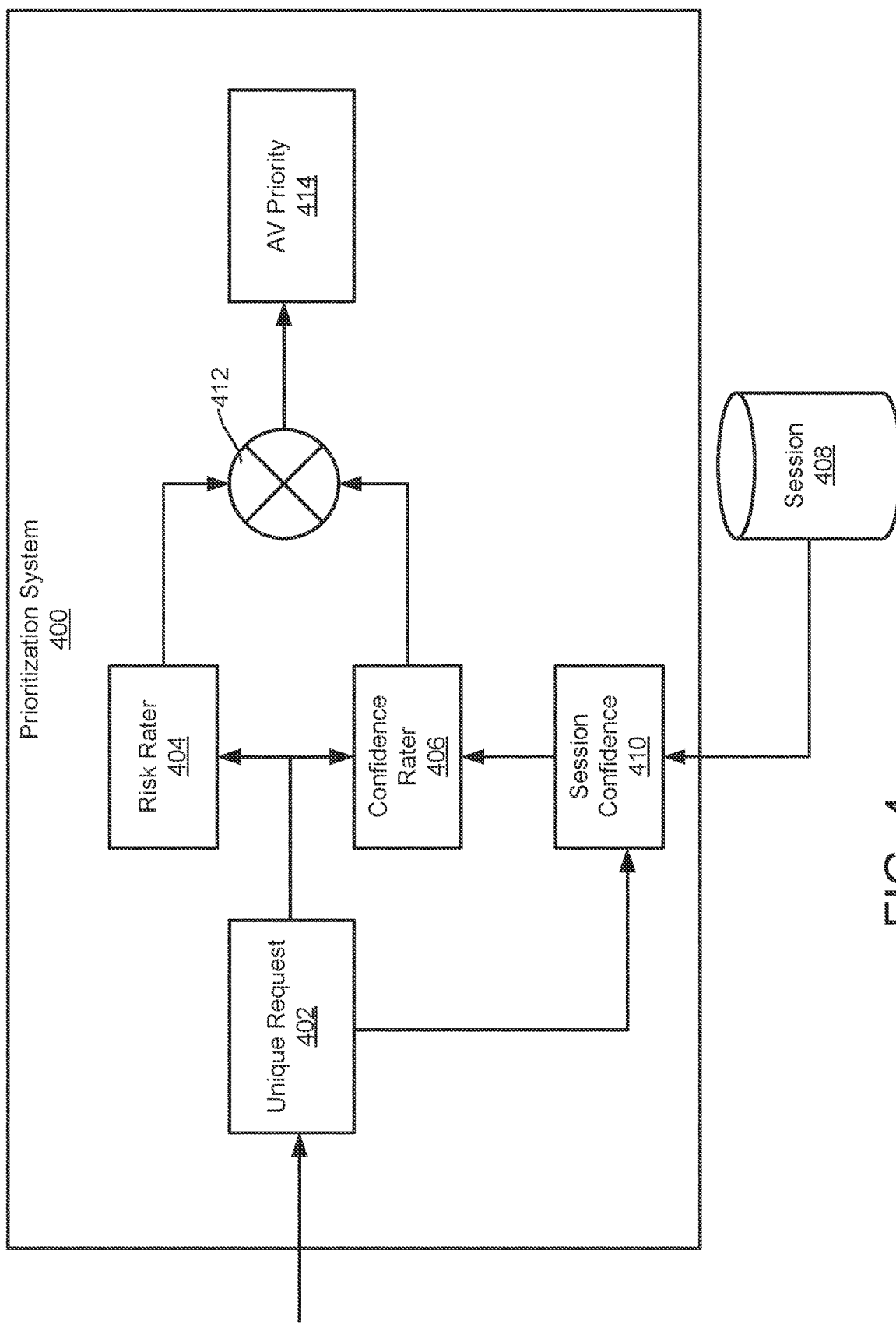
FIG. 4 illustrate a schematic of an example prioritization system, according to some aspects of the disclosed technology.

FIG. 4 illustrate a schematic of an example prioritization system 400. The prioritization system 400 can function to determine a priority of an AV for receiving remote assistance according to the techniques described herein. The resultant priority determined by the prioritization system 400 can be used in ranking the AV in a priority queue for providing remote assistance to AVs in a fleet of AVs that includes the AV.

The prioritization system 400 receives a unique request 402 for remote assistance from an AV. The risk rater 404 identifies a risk associated with not fulfilling the unique request 402. The risk rater 404 can identify the risk using the techniques described herein and the risk factors described herein. Specifically, the risk rater 404 can identify a severity score that is a best effort estimate of risk based on risk factors identifiable from a scene at the AV. The risk rater 404 can identify the risk associated with not fulfilling the unique request 402 based on known risk factors and then iterate through road data to identify additional risk factors that can be used in determine the risk.

The confidence rater 406 identifies a confidence that the unique request 402 is associated with the AV needing remote assistance. The confidence rater 406 can identify the confidence through the techniques described herein. Specifically, the confidence rater 406 can identify the confidence based on the unique request 402. Further, the confidence rater 406 can identify the confidence based on session data stored in the session datastore 408. The session data can include data describing contexts of past sessions and current session of the AV that made the unique request 402. Further, the session data can include data describing contexts of past sessions and current session of other AVs.

The prioritization system 400 includes a session confidence system 410 that identifies a session confidence factor based on applicable sessions, such as past sessions of the AV that made the unique request 402, a current session of the AV that made the unique request 402, past sessions of other AVs, and current sessions of other AVs. The session confidence system 410 can identify the confidence factor, otherwise referred to as confidence multiplier, as a function of the unique request 402 and the applicable sessions. Specifically, the session confidence system 410 can identify the session confidence factor through heuristics, machine learning models, or a combination thereof that are applied to contexts for both the unique request 402 and applicable sessions. Examples of heuristics include: if a certain AV's recent FP ("false positive") rate exceeds a threshold, lower the confidence score for the AV's future requests; if the recent FP rate around the request location across all AVs exceeds a threshold, lower the confidence score; if the recent FP rate of the same AV exceeds a threshold, lower the confidence score; and among all initiation reasons, lower the confidence for the initiator with higher empirical FP rate.

The session confidence factor that is identified by the session confidence system 410 based on sessions can be used by the confidence rater 406 to identify an overall confidence that the AV making the unique request 402 needs remote assistance. Specifically, the session confidence rater 406 can use the unique request 402 and the session confidence factor determined by the session confidence system 410 to determine an overall confidence that the AV needs remote assistance. For example, the overall confidence can be calculated as a product of a confidence score provided by the AV in the unique request and a multiplier that is the session confidence factor identified by the session confidence system 410. The multiplier can be identified by the session confidence system 410 based on session history and features of the current unique request 402.

The prioritization system 400 includes a multiplier 412 that combines the overall confidence determined by the confidence rater 406 and the risk determined by the risk rater 404 into an overall AV priority 414. Specifically, the multiplier 412 can determine the AV priority 414 as the product of a confidence score that is output by the confidence rater 406 and a risk severity score that is output by the risk rater 404. In turn, the overall AV priority 414 can be used to rank the AV in a queue for providing remote assistance to AVs.

Figure 5:
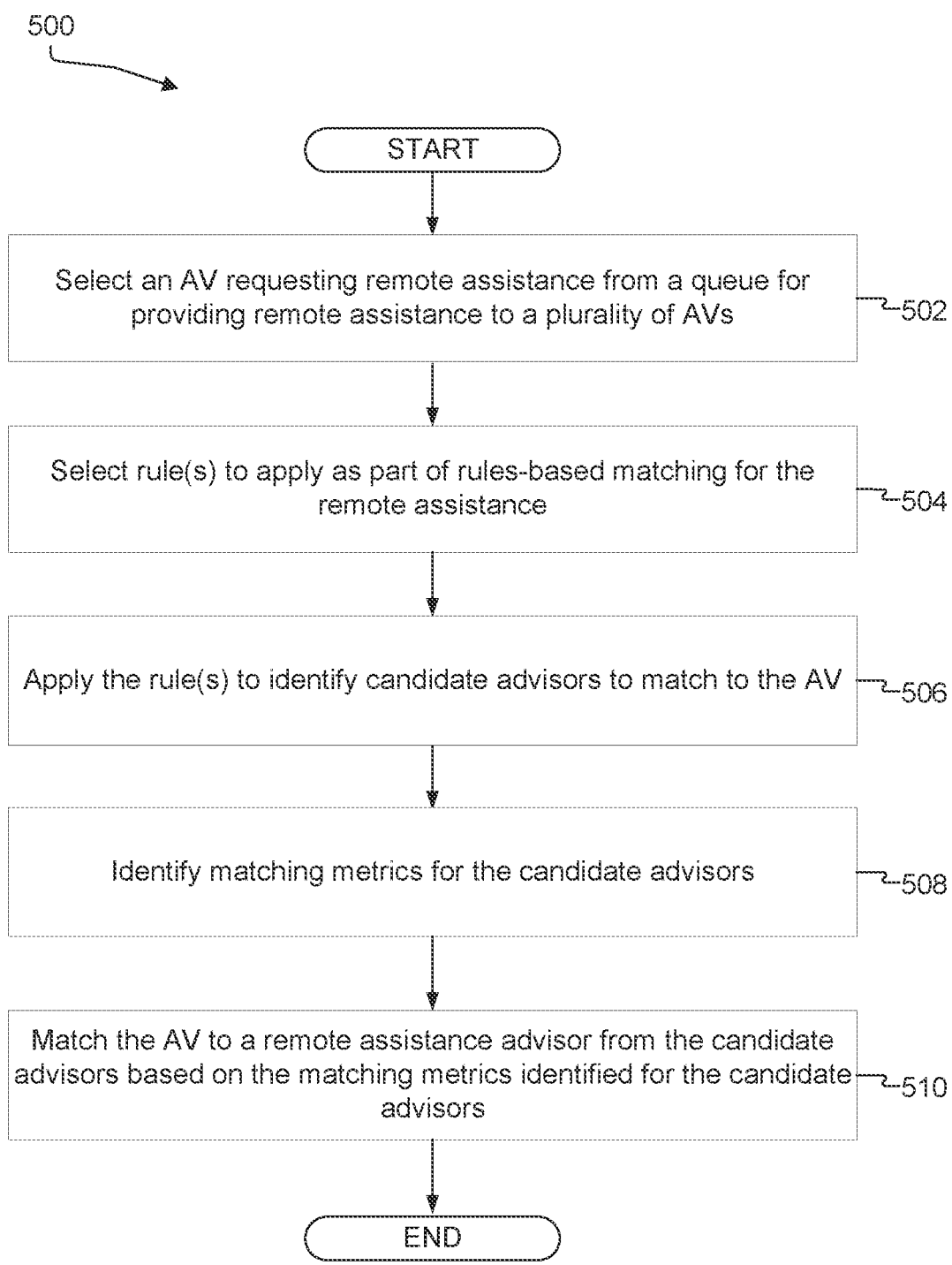
FIG. 5 illustrates a flowchart for an example method of matching an AV to a remote assistance advisor through rules-based matching after the AV is selected from a queue, according to some aspects of the disclosed technology.

The disclosure now continues with a discussion of matching an AV to a remote assistance advisor through rules-based matching. Specifically, FIG. 5 illustrates a flowchart 500 for an example method of matching an AV to a remote assistance advisor through rules-based matching after the AV is selected from a queue. The method shown in FIG. 5 is provided by way of example, as there are a variety of ways to carry out the method. Additionally, while the example method is illustrated with a particular order of operations, those of ordinary skill in the art will appreciate that FIG. 5 and the modules shown therein can be executed in any order and can include fewer or more modules than illustrated. Each module shown in FIG. 5 represents one or more operations, processes, methods or routines in the method.

At operation 502, an AV requesting remote assistance is selected from a queue of AVs. Specifically, the queue of AVs can be a queue for providing remote assistance to a plurality of AVs. The AV can be ranked in the queue according to applicable techniques, such as the techniques described herein. The AV can be selected from the queue based on the position of the AV in the queue. For example, the AV can be selected form the queue based on the AV being first in the queue.

At operation 504, one or more rules are selected to apply as part of rules-based matching for the remote assistance. The rules can be selected based on a context associated with the AV requesting remote assistance. For example, the rules can be selected based on a location of the AV when the AV requested the remote assistance. In another example, the rules can be selected based on a vehicle type of the AV.

Rules that are applied for rules-based matching can include static rules. Static rules can include applicable rules that remain unchangeable at runtime when applying the rules in rules-based matching. Specifically, static rules can be built-in at compile time and remain unchangeable at run time. An example of a static rule can include that advisors should be in the same cloud region as an AV requesting remote assistance.

Additionally, rules that are applied for rules-based matching can include dynamic rules. Dynamic rules can include applicable rules that can be added, updated, removed, or a combination thereof at runtimes. Dynamic rules can be defined, updated, and removed by an applicable authority. Specifically, dynamic rules can be defined, updated, and removed by human administrators, e.g. through a service backend. An example of a dynamic rule can include operation driven rules that can be changed quickly for changing enterprise needs. An operation driven rule can include an applicable rule related to operation of remote advisors providing remote assistance to a fleet of AVs. For example, an operation driven rule can include that specific AVs in a geolocation are assigned to a group of advisors with a specific skill.

Rules that are applied for rules-based matching can also include ephemeral rules. Ephemeral rules can include applicable exceptions that are temporarily applied in matching AVs to remote assistance advisors. Examples of ephemeral rules include exceptions to priority dispatching and exceptions to session reconnections. Ephemeral rules can be created and deleted programmatically during runtime.

At operation 506, the rules are applied to identify candidate advisors to match to the AV. Specifically, the rules can be applied to select one or more advisors from a plurality or pool of advisors. In turn the one or more advisors selected from the pool of advisors can serve as candidate advisors. Candidate advisors can be selected according to an applicable technique, such as the techniques described herein. Specifically, candidate advisors can be selected from a pool of advisors based on the candidate advisors meeting all or a portion of the rules selected at operation 504. More specifically, the candidate advisors can be selected from the pool of advisors based on the candidate advisors meeting required rules of the rules selected at operation 504.

At operation 508, matching metrics for the candidate advisors are identified. Matching metrics can include an applicable metric that is indicative of a degree to which the candidate advisors match the AV. Specifically, the matching metric can include a matching score that is identified for each candidate advisor. Matching metrics can be identified for the candidate advisors based on the rules that are selected at operation 504. Specifically, matching metrics can be identified for the candidate advisors based on whether dynamic rules are met.

At operation 510, the AV is matched to a remote assistance advisor from the candidate advisors based on the matching metric identified for the candidate advisors. Specifically, a remote assistance advisor can be selected from the candidate advisors based on the matching metric of the advisor in relation to matching metrics of the other candidate advisors. In turn, the selected remote assistance advisor can be matched to the AV for providing remote assistance to the AV.

Figure 6:
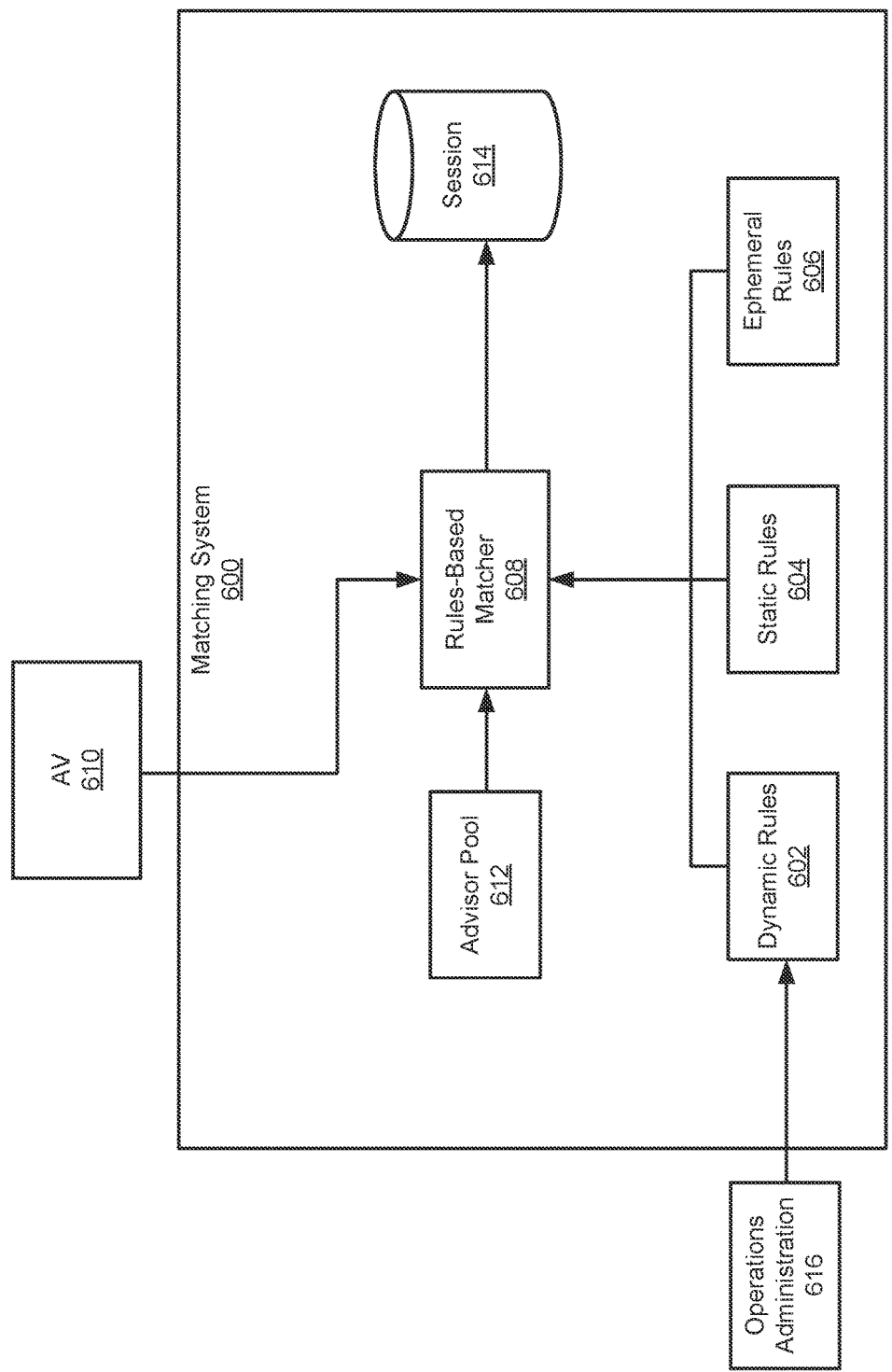
FIG. 6 illustrates a schematic of a matching system 600 for matching an AV requesting remote assistance to a remote assistance advisor, according to some aspects of the disclosed technology.

FIG. 6 illustrates a schematic of a matching system 600 for matching an AV requesting remote assistance to a remote assistance advisor. Specifically, the matching system 600 includes dynamic rules 602, static rules 604, and ephemeral rules 606 that can be applied by the matching system 600 as part of rules-based matching of AVs to remote assistance advisors. Table 1 provides example fields that can be used in defining rules for performing rules-based matching.

TABLE 1

| Field | Type | Purpose |
| --- | --- | --- |
| id | string | A unique ID to identify the rule, e.g. "static-1-1", "dynamic-2-3". |
| ttl | int | Time to live in seconds, or –1 if infinity. Default is –1. |
| created | Epoch timestamp | When the rule was created. Only applicable to dynamic and ephemeral rules. |
| required | bool | True if the rule is required for a match. Default is false, i.e. optional. Most rules should be optional. |
| stack | enum | Beta/Stable |
| weight | int | A weight to express how much the match under this rule is preferred. Only applicable to optional rules. Range: –10 to 10. Default is 0. |
| advisor_filter | Filter | The filter specifies which Advisors the rule applies to. |
| av_filter | Filter | The filter specifies which AVs the rule applies to. |

The following are example rules that are defined according to the fields shown in Table 1.

"Route Houston AVs to the PHX OCC if possible"
  TTL: infinity
  Required: false
  Weight: 10
  Advisor filter: Terminal.site==PHX
  Request filter: AV.city==Houston
"Route VIN XXX to Advisor A/B/C for next 8 hours"
  TTL: 8 hours
  Required: true
  Weight: None
  Advisor filter: Advisor.email in [A, B, C]
  Request filter: AV.vin==XXX
"Route EMV requests to L3 Advisors if possible"
  TTL: infinity
  Required: false
  Weight: 5
  Advisor filter: Advisor.level==3
  Request filter: request.reason==EMV
"Route AVs in a zone to Advisor A for next 30 minutes"
  TTL: 30 minutes
  Required: true
  Weight: None
  Advisor filter: Advisor.email==A
  Request filter: AV.location is inside a zone
"Suppress collision requests from VIN XXX for next 4 hours"
  TTL: 4 hours
  Required: true
  Weight: None
  Advisor filter: MatchNone
  Request filter: AV.vin==XXX AND request.reason==Collision The matching system 600 includes a rules based matcher 608. The rules-based matcher 608 can match the AV 610 to an advisor from the advisor pool 612 using the techniques described herein. Specifically, the rules-based matcher 608 can apply specific rules of the dynamic rules 602, the static rules 604, and the ephemeral rules 606 to match the AV 610 to an advisor from the advisor pool 612. As follows, the rules-based matcher 608 can update session data for the session of the AV that is stored in the session datastore 614 to indicate the advisor that is matched to the AV 610.

The dynamic rules 602 can be updated during runtime. Specifically, an operations administration 616 can update the dynamic rules 602.

The system and techniques described herein can be implemented with a session monitor. The session monitor can generate metrics about AVs and remote assistance provided or not provided during sessions. In turn, the session level metrics can be aggregated into fleet level metrics. The metrics can be presented to administrators who can manage the systems described herein based on the metrics. Further the session monitor can updated session data. For example, the session monitor can update the session datastore 408 which can be used in determining AV priority.

Figure 7:
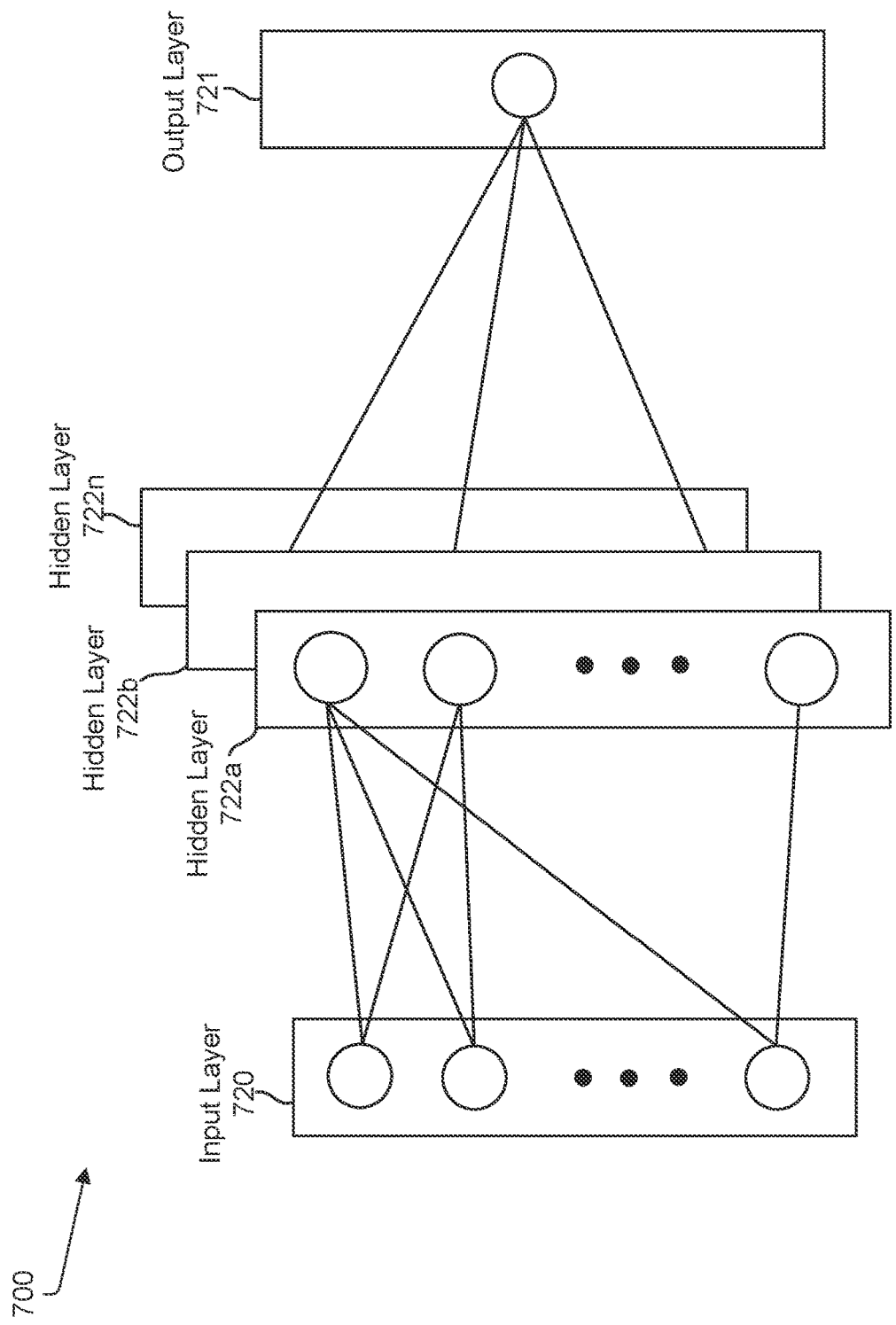
FIG. 7 illustrates an example of a deep learning neural network, according to some aspects of the disclosed technology.

In FIG. 7, the disclosure now turns to a further discussion of models that can be used through the systems and techniques described herein. FIG. 7 is an example of a deep learning neural network 700 that can be used to implement all or a portion of the systems and techniques described herein. An input layer 720 can be configured to receive sensor data and/or data relating to an environment surrounding an AV. Neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. Neural network 700 further includes an output layer 721 that provides an output resulting from the processing performed by the hidden layers 722a, 722b, through 722n.

Neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2} (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
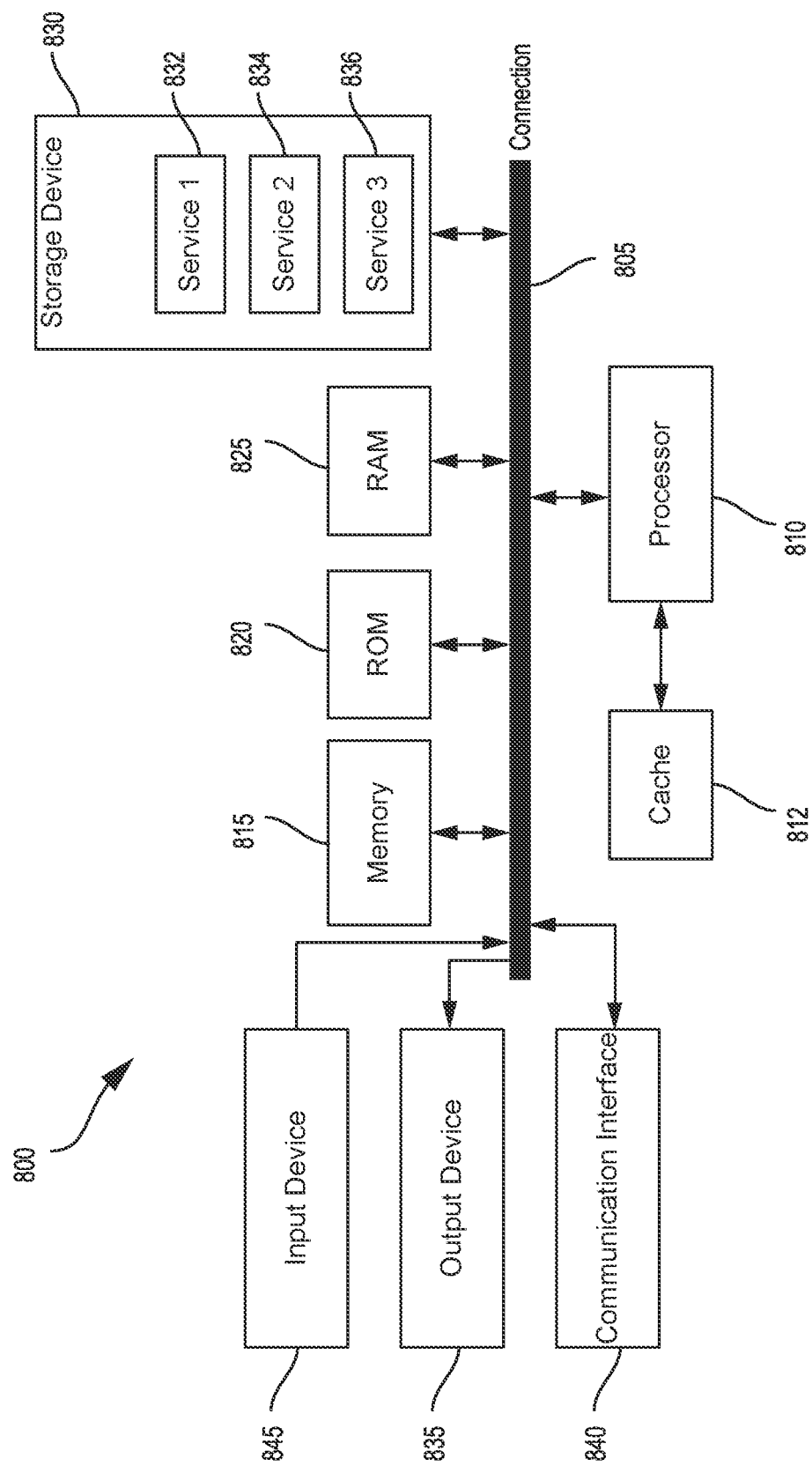
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Illustrative examples of the disclosure include:

Aspect 1. A computer-implemented method comprising: receiving a request for remote assistance for an autonomous vehicle (AV); determining a priority for ranking the AV in a queue for providing remote assistance to a fleet of autonomous vehicles AVs based on the request for remote assistance; ranking the AV in the queue based on the determined priority; matching the AV to a remote assistance advisor through rules-based matching according to a position of the AV in the queue; and facilitating communication between the remote assistance advisor matched to the AV.

Aspect 2. The computer-implemented method of Aspect 1, further comprising matching the AV the remote assistance advisor in response to the AV being at a specific position in the queue.

Aspect 3. The computer-implemented method of any of Aspects 1 and 2, further comprising: selecting one or more rules to apply as part of the rules-based matching; applying the one or more rules to identify candidate advisors to match to the AV; identifying matching metrics for the candidate advisors; and matching the AV to the remote assistance advisor from the candidate advisors based on the matching metrics identified for the candidate advisors.

Aspect 4. The computer-implemented method of Aspect 3, wherein the one or more rules comprise a required rule and an optional rule, the method further comprising matching the AV to the remote assistance advisor from the candidate advisors based on whether the required rule is met.

Aspect 5. The computer-implemented method of Aspect 3, wherein the one or more rules comprise a dynamic rule and the dynamic rule can be added, updated, removed, or a combination thereof when performing the rules-based matching.

Aspect 6. The computer-implemented method of any of Aspects 1 through 5, further comprising: identifying a confidence for the request, the confidence for the request indicative of whether the AV needs the remote assistance; and ranking the AV in the queue based on the determined confidence for the request.

Aspect 7. The computer-implemented method of Aspect 6, further comprising identifying the confidence for the request based on a context associated with the request, historical requests for remote assistance made by the AV, outcomes of the historical requests for remote assistance made by the AV, or a combination thereof.

Aspect 8. The computer-implemented method of Aspect 6, wherein the confidence for the request is identified through application of a framework and the framework is updated based on a context associated with handling the request.

Aspect 9. The computer-implemented method of any of Aspects 1 through 8 further comprising: identifying a severity associated with failing to fulfill the request for the remote assistance; and ranking the AV in the queue based on the determined severity associated with failing to fulfill the request.

Aspect 10. A system comprising: one or more processors; and at least one computer-readable storage medium having stored therein instructions which, when executed by the one or more processors, cause the one or more processors to: receive a request for remote assistance for an autonomous vehicle (AV); determine a priority for ranking the AV in a queue for providing remote assistance to a fleet of autonomous vehicles AVs based on the request for remote assistance; rank the AV in the queue based on the determined priority; match the AV to a remote assistance advisor through rules-based matching according to a position of the AV in the queue; and facilitate communication between the remote assistance advisor matched to the AV.

Aspect 11. The system of Aspect 10, wherein the instructions further cause the one or more processors to match the AV to the remote assistance advisor in response to the AV being at a specific position in the queue.

Aspect 12. The system of any of Aspects 10 and 11, wherein the instructions further cause the one or more processors to: select one or more rules to apply as part of the rules-based matching; apply the one or more rules to identify candidate advisors to match to the AV; identify matching metrics for the candidate advisors; and match the request to the remote assistance advisor from the candidate advisors based on the matching metrics identified for the candidate advisors.

Aspect 13. The system of Aspect 12, wherein the one or more rules comprise a required rule and an optional rule, and the instructions further cause the one or more processors to match the AV to the remote assistance advisor from the candidate advisors based on whether the required rule is met.

Aspect 14. The system of Aspect 12, wherein the one or more rules comprise a dynamic rule and the dynamic rule can be added, updated, removed, or a combination thereof when performing the rules-based matching.

Aspect 15. The system of any of Aspects 10 through 14, wherein the instructions further cause the one or more processors to: identify a confidence for the request, the confidence for the request indicative of whether the AV needs the remote assistance; and rank the AV in the queue based on the determined confidence for the request.

Aspect 16. The system of Aspect 15, wherein the instructions further cause the one or more processors to identify the confidence for the request based on a context associated with the request, historical requests for remote assistance made by the AV, outcomes of the historical requests for remote assistance made by the AV, or a combination thereof.

Aspect 17. The system of Aspect 15, wherein the confidence for the request is identified through application of a framework and the framework is updated based on a context associated with handling the request.

Aspect 18. The system of any of Aspects 10 through 17, wherein the instructions further cause the one or more processors to: identify a severity associated with failing to fulfill the request for the remote assistance; and rank the AV in the queue based on the determined severity associated with failing to fulfill the request.

Aspect 19. A non-transitory computer-readable storage medium storing instructions for causing one or more processors to: receive a request for remote assistance for an autonomous vehicle (AV); determine a priority for ranking the AV in a queue for providing remote assistance to a fleet of autonomous vehicles AVs based on the request for remote assistance; rank the AV in the queue based on the determined priority; match the AV to a remote assistance advisor through rules-based matching according to a position of the AV in the queue; and facilitate communication between the remote assistance advisor matched to the AV.

Aspect 20. The non-transitory computer-readable storage medium of Aspect 19, wherein the instructions further cause the one or more processors to: identify a confidence for the request, the confidence for the request indicative of whether the autonomous vehicle needs the remote assistance; identify a severity associated with failing to fulfill the request for the remote assistance; and rank the AV in the queue based on the determined confidence for the request and the determined severity associated with failing to fulfill the request for the remote assistance.

Aspect 21. A system comprising means for performing a method according to any of Aspects 1 through 9.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:
   receiving, by one or more processors, an electronic communication comprising a request for remote assistance for an autonomous vehicle (AV), the request including real time sensor data generated by one or more sensors of the AV, wherein the real time sensor data comprises real time environmental information about a dynamic environment in which the AV is operating, real time AV information about the operating conditions of the AV, and real time AV passenger information about passengers within the AV;
   processing, by the one or more processors, the real time sensor data to generate a confidence score for the request, the confidence score representing a likelihood that the AV requires remote assistance;
   processing, by the one or more processors, the real time sensor data to generate a severity score that represents predicted consequences of failing to fulfill the request for remote assistance;
   computing, by the one or more processors, a priority score for the request as a function of the confidence score and the severity score;
   using the one or more processors to execute a prioritization system configured to rank the AV in a queue based at least in part on the computed priority score, wherein the queue comprises an electronic memory controlled by the prioritization system, and wherein the queue is configured to support providing remote assistance to a fleet of autonomous vehicles (AVs); and
   based at least in part on a position of the AV in the queue, establishing an electronic communications path for electronic communications between a remote assistance advisor and a computer system of the AV.

2. The computer-implemented method of claim 1, further comprising using the one or more processors to:
   match the AV to the remote assistance advisor through rules-based matching according to the position of the AV in the queue; or
   match the AV to the remote assistance advisor in response to the AV being at a specific position in the queue.

3. The computer-implemented method of claim 2, further comprising using the one or more processors to:
   select one or more rules to apply as part of the rules-based matching;
   apply the one or more rules to identify candidate advisors to match to the AV;
   identify matching metrics for the candidate advisors; and
   match the AV to the remote assistance advisor from the candidate advisors based on the matching metrics identified for the candidate advisors.

4. The computer-implemented method of claim 3, wherein the one or more rules comprise a required rule and an optional rule, the computer-implemented method further comprising matching the AV to the remote assistance advisor from the candidate advisors based on whether the required rule is met.

5. The computer-implemented method of claim 3, wherein the one or more rules comprise a dynamic rule and the dynamic rule are configured to be added, updated, removed, or a combination thereof when performing the rules-based matching.

6. The computer-implemented method of claim 1, wherein:
   processing the real time sensor data to generate the confidence score comprises analyzing at least one of the real time environmental information, the real time AV information, or the real time AV passenger information to determine the likelihood that the AV requires remote assistance; and
   using the one or more processors to execute the prioritization system comprises ranking the AV in the queue based at least in part on the computed confidence score.

7. The computer-implemented method of claim 6, wherein analyzing the real time sensor data to generate the confidence score further comprises analyzing, by the one or more processors, at least one of: historical sensor data generated by the one or more sensors of the AV, historical requests for remote assistance made by the AV, or outcomes of the historical requests for remote assistance made by the AV, in combination with the real time sensor data.

8. The computer-implemented method of claim 6, wherein:
   the confidence score is generated by the one or more processors through application of a computer-implemented framework that analyzes the real time sensor data and at least one of: historical sensor data generated by the one or more sensors of the AV, historical requests for remote assistance made by the AV, and outcomes of historical requests for remote assistance made by the AV; and
   the framework is updated by the one or more processors based on analysis of the real time sensor data and data associated with handling the request.

9. The computer-implemented method of claim 1, wherein processing the real time sensor data to generate the severity score comprises analyzing, by the one or more processors, at least one of the real time environmental information, the real time AV information, and the real time AV passenger information to determine predicted consequences of failing to fulfill the request for remote assistance.

10. A system comprising:
one or more processors; and
at least one computer-readable storage medium having stored therein instructions which, when executed by the one or more processors, cause the one or more processors to:
receive a request for remote assistance for an autonomous vehicle (AV), the request including real time sensor data generated by one or more sensors of the AV, wherein the real time sensor data comprises real time environmental information about a dynamic environment in which the AV is operating, real time AV information about the operating conditions of the AV, and real time AV passenger information about passengers within the AV;
process the real time sensor data to generate a confidence score for the request, the confidence score representing a likelihood that the AV requires remote assistance;
process the real time sensor data to generate a severity score that represents predicted consequences of failing to fulfill the request for remote assistance;
compute a priority score for the request as a function of the confidence score and the severity score;
execute a prioritization system configured to rank the AV in a queue based at least in part on the computed priority score, wherein the queue comprises an electronic memory controlled by the prioritization system, and wherein the queue is configured to support for providing remote assistance to a fleet of autonomous vehicles (AVs); and
based at least in part on a position of the AV in the queue, establishing an electronic communications path for electronic communications between a remote assistance advisor and a computer system of the AV.

11. The system of claim 10, wherein the instructions further cause the one or more processors to:
match the AV to the remote assistance advisor through rules-based matching according to the position of the AV in the queue; or
match the AV to the remote assistance advisor in response to the AV being at a specific position in the queue.

12. The system of claim 11, wherein the instructions further cause the one or more processors to:
select one or more rules to apply as part of the rules-based matching;
apply the one or more rules to identify candidate advisors to match to the AV;
identify matching metrics for the candidate advisors; and
match the request to the remote assistance advisor from the candidate advisors based on the matching metrics identified for the candidate advisors.

13. The system of claim 12, wherein the one or more rules comprise a required rule and an optional rule, and the instructions further cause the one or more processors to match the AV to the remote assistance advisor from the candidate advisors based on whether the required rule is met.

14. The system of claim 12, wherein the one or more rules comprise a dynamic rule and the dynamic rule are configured to be added, updated, removed, or a combination thereof when performing the rules-based matching.

15. The system of claim 10, wherein:
processing the real time sensor data to generate the confidence score comprises analyzing at least one of the real time environmental information, the real time AV information, or the real time AV passenger information to determine the likelihood that the AV requires remote assistance; and
using the one or more processors to execute the prioritization system comprises ranking the AV in the queue based at least in part on the computed confidence score.

16. The system of claim 15, wherein analyzing the real time sensor data to generate the confidence score further comprises analyzing, by the one or more processors, at least one of: historical sensor data generated by the one or more sensors of the AV, historical requests for remote assistance made by the AV, or outcomes of the historical requests for remote assistance made by the AV, in combination with the real time sensor data.

17. The system of claim 15, wherein;
the confidence score is generated by the one or more processors through application of a computer-implemented framework that analyzes the real time sensor data and at least one of: historical sensor data generated by the one or more sensors of the AV, historical requests for remote assistance made by the AV, and outcomes of historical requests for remote assistance made by the AV; and
the framework is updated by the one or more processors based on analysis of the real time sensor data and data associated with handling the request.

18. The system of claim 10, wherein processing the real time sensor data to generate the severity score comprises analyzing, by the one or more processors, at least one of the real time environmental information, the real time AV information, and the real time AV passenger information to determine predicted consequences of failing to fulfill the request for remote assistance.

19. A non-transitory computer-readable storage medium storing instructions for causing one or more processors to:
receive a request for remote assistance for an autonomous vehicle (AV) the request including real time sensor data generated by one or more sensors of the AV, wherein the real time sensor data comprises real time environmental information about a dynamic environment in which the AV is operating, real time AV information about the operating conditions of the AV, and real time AV passenger information about passengers within the AV;
process the real time sensor data to generate a confidence score for the request, the confidence score representing a likelihood that the AV requires remote assistance;
process the real time sensor data to generate a severity score that represents predicted consequences of failing to fulfill the request for remote assistance;
compute a priority score for the request as a function of the confidence score and the severity score;
execute a prioritization system configured to rank the AV in a queue based at least in part on the computed priority score, wherein the queue comprises an electronic memory controlled by the prioritization system, and wherein the queue is configured to support providing remote assistance to a fleet of autonomous vehicles (AVs); and
based at least in part on a position of the AV in the queue, establishing an electronic communications path for electronic communications between a remote assistance advisor and a computer system of the AV.

20. The non-transitory computer-readable storage medium of claim 19, wherein processing the real time sensor data to generate the severity score comprises analyzing, by the one or more processors, at least one of the real time environmental information, the real time AV information, and the real time AV passenger information to determine predicted consequences of failing to fulfill the request for remote assistance.

\* \* \* \* \*